United States Patent
Kim et al.

(10) Patent No.: US 12,499,289 B2
(45) Date of Patent: Dec. 16, 2025

(54) DEVICE AND METHOD FOR BLADE MODELING

(71) Applicant: NEARTHLAB INC., Seoul (KR)

(72) Inventors: Youngjoo Kim, Seoul (KR); Junyong Lee, Seoul (KR); Dongyeon Lee, Seoul (KR); Byungyoon Lee, Seoul (KR)

(73) Assignee: NEARTHLAB INC., Seoul (KR)

( * ) Notice: Subject to any disclaimer, the term of this patent is extended or adjusted under 35 U.S.C. 154(b) by 0 days.

(21) Appl. No.: 18/853,472

(22) PCT Filed: Sep. 6, 2024

(86) PCT No.: PCT/KR2024/013530
§ 371 (c)(1),
(2) Date: Feb. 19, 2025

(87) PCT Pub. No.: WO2025/095331
PCT Pub. Date: May 8, 2025

(65) Prior Publication Data
US 2025/0181789 A1 Jun. 5, 2025

(30) Foreign Application Priority Data
Nov. 3, 2023 (KR) .......... 10-2023-0150878

(51) Int. Cl.
*G06F 30/17* (2020.01)
*B64U 10/14* (2023.01)
(Continued)

(52) U.S. Cl.
CPC .............. *G06F 30/17* (2020.01); *B64U 10/14* (2023.01); *B64U 2101/30* (2023.01); *G06F 2113/06* (2020.01)

(58) Field of Classification Search
CPC ...... G06F 30/00; G06F 30/17; G06F 2113/06; G06F 2111/10; G06F 30/20; B64U 10/14;
(Continued)

(56) References Cited

U.S. PATENT DOCUMENTS 11,084,582 B2    8/2021 Noto
2018/0003161 A1*  1/2018 Michini ................ G06T 7/0004

FOREIGN PATENT DOCUMENTS

JP    2018181235 A    11/2018
KR   101730821 B1 *   4/2017 .............. G06F 11/34
(Continued)

OTHER PUBLICATIONS

Notification of Preliminary Examination Results for Korean (KR) Patent Application No. 10-2023-0150878.
(Continued)

*Primary Examiner* — Cedric Johnson
(74) *Attorney, Agent, or Firm* — Perilla Knox & Hildebrandt LLP; Thomas B. Hildebrandt

(57) ABSTRACT

A device for modeling blades comprises a data collection module configured to receive sensing data of a drone for a reference blade included in a wind turbine, and a modeling module configured to generate a blade model by performing modeling on the wind turbine based on the sensing data, wherein the modeling module comprises: a reference blade model generation unit configured to generate a reference blade model by performing modeling on the reference blade, and an other blade model generation unit configured to generate an other blade model for at least one other blade included in the wind turbine based on the reference blade model.

12 Claims, 14 Drawing Sheets

(51) Int. Cl.
*B64U 101/30* (2023.01)
*G06F 113/06* (2020.01)

(58) Field of Classification Search
CPC ..................... B64U 2101/30; B64U 2101/31;
B64U 20/87; F03D 17/00; B64C 39/02;
G06V 10/46; Y02E 10/72
USPC ........................................................... 703/1
See application file for complete search history.

(56) References Cited

FOREIGN PATENT DOCUMENTS

| KR | 20190120399 A | 10/2019 |
| KR | 102431247 B1 | 8/2022 |
| KR | 102453446 B1 | 10/2022 |

OTHER PUBLICATIONS

Notice of Allowance for Korean (KR) Patent Application No. 10-2023-0150878.

\* cited by examiner

DEVICE AND METHOD FOR BLADE MODELING

CROSS-REFERENCE TO RELATED APPLICATIONS

The present disclosure is a national phase application under 35 U.S.C. § 371 of International Application No. PCT/KR2024/013530 filed Sep. 6, 2024, which claims the benefit of and priority to Korean Patent Application No. 10-2023-0150878 filed Nov. 3, 2023, the contents of which being incorporated by reference in their entireties herein.

TECHNICAL FIELD

The present disclosure relates to a device and method for modeling blades.

In particular, the present disclosure relates to a device and method for modeling blades that can make up for the insufficient sensing capabilities of a small drone equipped with limited sensors by performing blade modeling using sensing data on at least one blade of a wind turbine.

BACKGROUND ART

The contents set forth in this section merely provide background information on the present embodiments and do not constitute prior art.

In general, when inspecting a wind turbine using a drone, a method of controlling the position of the drone based on currently collectible sensor measurements is used.

However, small drones cannot be equipped with sensors such as lidar sensors used for distance measurement due to spatial limitations, and thus, there are cases where only limited sensors such as cameras can be equipped. In this case, there are many cases where the distance between the drone and the wind turbine or the like cannot be properly determined due to insufficient sensing capabilities.

In particular, if there are no distinct features or the planes are tilted as with the blades of a wind turbine, the distance measurement accuracy of a camera (e.g., a stereo camera) equipped on a small drone is reduced significantly.

Accordingly, there has been a sufficient need to improve the accuracy of mission control by accurately measuring the distance between a small drone and a structure when using the corresponding drone in inspecting the structure such as a wind turbine.

SUMMARY OF INVENTION

Technical Problem

It is an object of the present disclosure to provide a device and method for modeling blades that can inspect all blades of a wind turbine at once through a blade modeling process even when a small drone equipped with limited sensors is used.

Specifically, it is an object of the present disclosure to provide a device and method for modeling blades that can make up for the insufficient sensing capabilities of a small drone equipped with limited sensors by modeling a reference blade model (a vertical blade model), then predicting modeling results for other blades through the reference blade model, and correcting the predicted values through sensing data on the other blades.

In addition, it is an object of the present disclosure to provide a device and method for modeling blades that can overcome limitations through modeling results for each surface of a reference blade (a vertical blade) as a modeling process for the blades of a wind turbine is not easy due to the cone angle, tilt angle, etc.

The objects of the present disclosure are not limited to the objects mentioned above, and other objects and advantages of the present disclosure that have not been mentioned can be understood by the following description and will be more clearly understood by the embodiments of the present disclosure. Further, it will be readily appreciated that the objects and advantages of the present disclosure may be realized by the means set forth in the claims and combinations thereof.

Solution to Problem

According to some aspects of the disclosure, a device for modeling blades comprises: a data collection module configured to receive sensing data of a drone for a reference blade included in a wind turbine; and a modeling module configured to generate a blade model by performing modeling on the wind turbine based on the sensing data, wherein the modeling module comprises: a reference blade model generation unit configured to generate a reference blade model by performing modeling on the reference blade, and an other blade model generation unit configured to generate an other blade model for at least one other blade included in the wind turbine based on the reference blade model, and wherein the blade model comprises at least one of at least one virtual straight line set along each of a plurality of surfaces included in the blade and a virtual coordinate system for each of the plurality of surfaces determined based on the virtual straight line.

According to some aspects, the sensing data comprises photographing data captured by a camera included in the drone, and wherein the reference blade model generation unit: measures location data on a first measurement surface included in the reference blade using the photographing data, and sets a virtual straight line for the first measurement surface based on the measured location data on the first measurement surface.

According to some aspects, the reference blade model generation unit: based on a first time point of the photographing data, recognizes a blade box from the photographing data, determines a center point of the recognized blade box, measures first location data, which is location data of the determined center point, and sets a center line, which is a virtual straight line for the first measurement surface, based on the first location data.

According to some aspects, the reference blade model generation unit: based on a second time point different from the first time point, recognizes a blade box from the photographing data, determines a center point of the recognized blade box, measures second location data, which is location data of the determined center point, and sets the center line by regression analysis using the first location data and the second location data.

According to some aspects, the reference blade model generation unit: when setting a virtual straight line for a second measurement surface different from the first measurement surface included in the reference blade, measures location data on the second measurement surface using the photographing data, and sets a virtual straight line for the second measurement surface based on the measured location data on the second measurement surface and a plurality of virtual straight lines for the first measurement surface including the center line.

According to some aspects, the plurality of virtual straight lines for the first measurement surface including the center line comprises the center line, a left line that is a virtual straight line based on a left edge of the blade box, and a right line that is a virtual straight line based on a right edge of the blade box.

According to some aspects, the reference blade model generation unit: derives a plurality of preliminary virtual straight lines for the second measurement surface based on the measured location data on the second measurement surface, and corrects the plurality of preliminary virtual straight lines for the second measurement surface by using at least one of a parallel translation technique and an orthogonal projection technique based on the plurality of virtual straight lines for the first measurement surface.

According to some aspects, the reference blade model generation unit sets the virtual coordinate system for each of the plurality of surfaces included in the reference blade, with a point where a nose of the wind turbine and the center line intersect as an origin and the center line as one axis, and the other blade model generation unit comprises a prediction unit configured to predict a preliminary other blade model by rotating the virtual coordinate system for each of the plurality of surfaces by a predetermined angle.

According to some aspects, the data collection module further receives sensing data of the drone for the other blades, and the other blade model generation unit further comprises a correction unit configured to correct the predicted preliminary other blade model using the sensing data of the drone for the other blades and generate the other blade model.

According to some aspects, the correction unit corrects the preliminary other blade model using a recursive least squares method.

According to some aspects of the disclosure, a method of modeling any one blade of a wind turbine, comprises: obtaining photographing data on a first surface of the blade at a plurality of time points, modeling the first surface as a virtual straight line for the first surface, and modeling a second surface as a virtual straight line parallel to the virtual straight line for the first surface or a virtual straight line orthogonally projected to the virtual straight line for the first surface.

According to some aspects, the virtual straight line is represented by a reference point and a vector, and wherein the modeling the first surface: generates a plurality of location data from the photographing data on the first surface, calculates the reference point as an average of the plurality of location data, and calculates the vector using a difference between the location data and the average.

According to some aspects, the modeling the first surface models the first surface as a center line, a right line, and a left line, and wherein the modeling the second surface: models the second surface by orthogonally projecting the center line, the right line, and the left line of the first surface onto the second surface based on a right line of the second surface if the second surface is a left surface of the first surface, and models the second surface by orthogonally projecting the center line, the right line, and the left line of the first surface onto the second surface based on a left line of the second surface if the second surface is a right surface of the first surface.

According to some aspects, the modeling the first surface models the first surface as a center line, a right line, and a left line, and wherein the modeling the second surface models the second surface so that center lines, right lines, and left lines of the first surface and the second surface are parallel if the second surface is a rear surface of the first surface.

Advantageous Effects

The device and method for modeling blades in accordance with some embodiments of the present disclosure have a novel effect of being able to inspect all blades of a wind turbine at once through a blade modeling process even when a small drone equipped with limited sensors is used.

Specifically, the device and method for modeling blades in accordance with some embodiments of the present disclosure can make up for the insufficient sensing capabilities of a small drone equipped with limited sensors (e.g., a stereo camera) by modeling a reference blade model (a vertical blade model), then predicting modeling results for other blades through the reference blade model, and correcting the predicted values through sensing data on the other blades.

In this case, the device and method for modeling blades in accordance with some embodiments of the present disclosure can express the three-dimensional shape of a blade by modeling the blade as a plurality of straight lines (e.g., eight straight lines) rather than a single straight line, and thus the modeling accuracy can be improved.

Further, the device and method for modeling blades in accordance with some embodiments of the present disclosure can overcome the difficulty of the blade modeling process due to the cone angle, tilt angle, etc., through the modeling results for each surface of the reference blade (vertical blade).

In addition, the device and method for modeling blades in accordance with some embodiments of the present disclosure have a novel effect of being able to obtain reference location information between the drone and the blade by using the corresponding blade modeling results after performing the blade modeling process. That is, the device and method for modeling blades in accordance with some embodiments of the present disclosure perform blade modeling on the surface of the blade rather than the center thereof, and accordingly, can compute the reference location between the drone and the corresponding surface through the blade modeling results.

In addition to the contents described above, specific effects of the present disclosure will be described together while describing the following specific details for carrying out the present disclosure.

DETAILED DESCRIPTION

Figure 1:
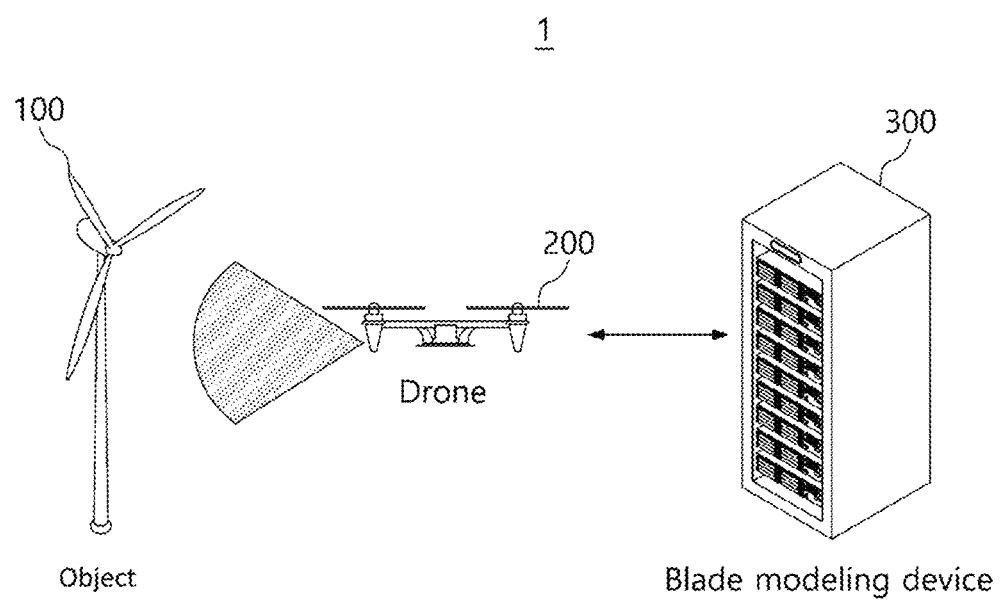
FIG. 1 shows a blade modeling system in accordance with some embodiments of the present disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Hereinafter, a device and method for modeling blades in accordance with some embodiments of the present disclosure will be discussed with reference to FIGS. 1 to 12.

FIG. 1 shows a blade modeling system in accordance with some embodiments of the present disclosure.

Referring to FIG. 1, a blade modeling system 1 (hereinafter referred to as "blade modeling system") for inspecting a wind turbine in accordance with some embodiments of the present disclosure may include a drone 200 that photographs an object 100 and a blade modeling device 300.

The object 100 may refer to a large facility that requires a large number of personnel and costs for inspection or that is highly dangerous for humans to perform inspection directly. For example, the object comprises an industrial structure, although embodiments of the present invention are not limited thereto.

As some examples, the object 100 may include, but is not limited to, wind turbines, buildings or facilities constructed for the purpose of operating businesses such as factories or buildings, bridges, power lines, distribution lines, roads, and the like. FIG. 1 shows a wind turbine as one example of the object 100.

In the following, it will be described assuming a case where the object 100 is a wind turbine for convenience of description.

The drone 200 may fly around the wind turbine 100 and include a device that checks the state of the wind turbine 100. The drone 200 may also be referred to as an unmanned aerial vehicle (UAV). The drone 200 may be configured to automatically fly around the wind turbine 100 along a predetermined path, but embodiments of the present disclosure are not limited thereto. For example, the drone 200 may also fly around the wind turbine 100 manually as needed. The drone 200 may be a flying drone that photographs the wind turbine 100 and/or the surrounding environment of the wind turbine 100, but embodiments are not limited thereto and may also be a ground drone, an underwater drone, etc.

The drone 200 may fly according to a pre-determined flight command and/or a control command for flight, operation, or the like received from the blade modeling device 300, and may obtain sensing data on the wind turbine 100.

As some examples, the drone 200 may collect sensing data on the wind turbine 100 while flying around the wind turbine 100, and transmit the collected sensing data to the blade modeling device 300.

The sensing data may include photographing data on each blade included in the corresponding wind turbine 100. In other words, the drone 200 may be equipped with mission equipment such as a camera (e.g., a stereo camera), and the drone 200 may transmit the photographing data on each blade of the wind turbine 100 captured via the corresponding camera to the blade modeling device 300. In this case, the photographing data may include image data and/or video data on each blade of the wind turbine 100.

In this case, the drone 200 may include a small drone. For example, the drone 200 in accordance with some embodiments of the present disclosure may be equipped with only an imaging device, such as a camera, as mission equipment. In other words, the mission equipment mounted on the drone 200 in accordance with some embodiments of the present disclosure may include a stereo camera but not a lidar sensor.

The blade modeling device 300 may generate a blade model based on the sensing data received from the drone 200. In other words, the blade modeling device 300 may receive the sensing data including the photographing data from the drone 200 and generate a blade model based on the received sensing data.

The blade model may include a reference blade model and an other blade model. The reference blade model may include modeling results regarding a reference blade, which is a blade whose angle with the ground is closest to the vertical out of the respective blades included in the wind turbine 100, and the other blade model may include modeling results regarding the other blades except for the reference blade out of the respective blades included in the wind turbine 100.

In this case, the blade model may include a virtual straight line and/or a virtual coordinate system set for each corresponding blade. In other words, the blade model may be in the form of a virtual straight line or a virtual coordinate system set for the corresponding blade. In this case, the virtual coordinate system may be generated based on the virtual straight line. One virtual straight line may be a virtual straight line connecting a start point and an end point in space. The start point and the end point may be represented by three-dimensional coordinates. The blade modeling device 300 may generate a blade model with one or more virtual straight lines for one blade. In one example, the blade modeling device 300 may generate a blade model including eight virtual straight lines representing the center lines of four surfaces and four edges for one blade.

As some examples, the blade model may include at least one virtual straight line set along each of a plurality of surfaces included in the corresponding blade and/or at least one virtual coordinate system for each of the plurality of surfaces determined based on the corresponding virtual straight line. The virtual coordinate system may be a three-dimensional coordinate system represented by x, y, and z axes. As one example, the reference blade model may include at least one virtual straight line set along each of a plurality of surfaces included in the reference blade and a virtual coordinate system for each of the plurality of surfaces determined based on the corresponding virtual straight line. As another example, the other blade model may be in the form of at least one virtual straight line set along each of a plurality of surfaces included in the other blades and a virtual coordinate system for each of the plurality of surfaces determined based on the corresponding virtual straight line.

The blade modeling device 300 may generate a reference blade model using sensing data on the reference blade, predict the other blade model using the generated reference blade model, and then correct the other blade model prediction result using sensing data on the other blades.

In this case, the blade modeling device 300 may perform modeling on each of the plurality of surfaces included in the reference blade when generating the reference blade model. In other words, the blade modeling device 300 may generate the reference blade model by performing modeling on each of the plurality of surfaces, for example, the first to fourth surfaces, included in the reference blade and then combining the modeling results for each surface. In this case, the blade modeling device 300 may correct the modeling result for another surface included in the reference blade by using the modeling result for one surface included in that reference blade.

The specific method of operation of the blade modeling device 300 will be described later.

Meanwhile, the drone 200 and the blade modeling device 300 may be connected via a communication network. In other words, the communication network may serve to exchange data between the drone 200 and the blade modeling device 300. In this case, the communication network may serve to provide a connection path so that the drone 200 and the blade modeling device 300 can transmit and receive data to and from each other.

The communication network may include a communication network by wired Internet technology, wireless Internet technology, and short-range communication technology. The wired Internet technology may include, for example, at least one of a local area network (LAN) and a wide area network (WAN). The wireless Internet technology may include, for example, at least one of wireless LAN (WLAN), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), and 5G New Radio (NR) technology. However, the present embodiment is not limited thereto. The short-range communication technology may include, for example, at least one of Bluetooth, Radio Frequency Identification (RFID), Infrared Data Association (IrDA), Ultra-Wideband (UWB), ZigBee, Near Field Communication (NFC), Ultra Sound Communication (USC), Visible Light Communication (VLC), Wi-Fi, Wi-Fi Direct, 5G New Radio (NR). However, the present embodiment is not limited thereto. The drone 200 and the blade modeling device 300 communicating via the communication network may comply with technical standards and standard communication methods for mobile communication. For example, the standard communication method may include at least one of Global System for Mobile communication (GSM), Code Division Multiple Access (CDMA), Code Division Multiple Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and 5G New Radio (NR). However, the present embodiment is not limited thereto.

In FIG. 1, the drone 200 and the blade modeling device 300 are shown as separate and distinct components. However, embodiments of the present disclosure are not limited thereto, and the functions of the blade modeling device 300 may be incorporated into the drone 200. In other words, each data processing process of the blade modeling device 300 may be performed by a processor included inside the drone 200. The drone 200 may include one or more processors. The processor may include a CPU, a GPU, and/or an NPU, etc.

However, the drone 200 and the blade modeling device 300 will be described assuming that they are separate and distinct components for convenience of description in the following.

Hereinafter, the blade modeling device 300 in accordance with some embodiments of the present disclosure will be described in more detail with further reference to FIG. 2.

Figure 2:
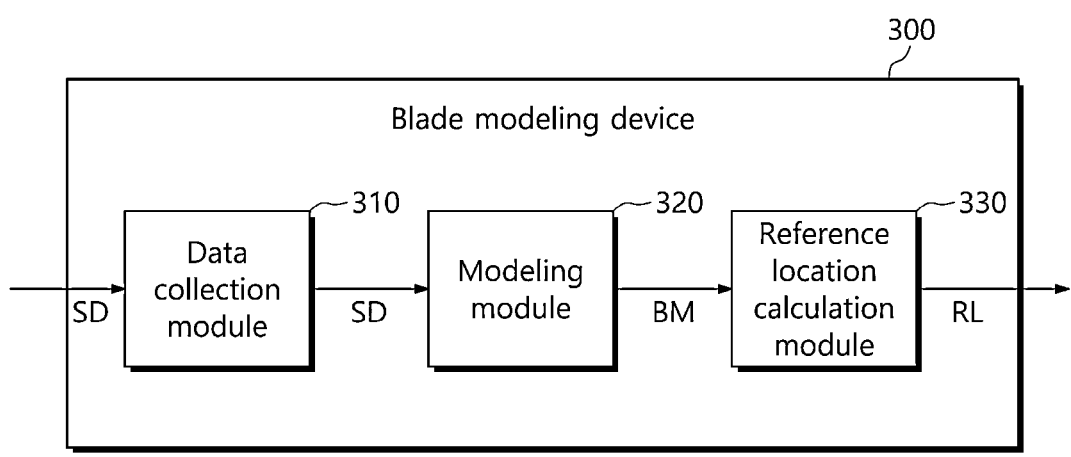
FIG. 2 is a block diagram of the blade modeling device in accordance with some embodiments of the present disclosure.

FIG. 2 is a block diagram of the blade modeling device in accordance with some embodiments of the present disclosure.

Referring to FIGS. 1 and 2, the blade modeling device 300 may include a data collection module 310, a modeling module 320, and a reference location calculation module 330. The blade modeling device 300 may include one or more processors, and the processor may perform the operations of the data collection module 310, the modeling module 320, and the reference location calculation module 330. The drone 200 may also include one or more processors, and the drone 200 may similarly perform the operations of the data collection module 310, the modeling module 320, and the reference location calculation module 330.

The data collection module 310 may collect sensing data (hereinafter referred to as "SD"). In other words, the data collection module 310 may receive sensing data SD on the wind turbine 100 from the drone 200.

The sensing data SD may include data obtained by photographing the wind turbine 100 by the drone 200. That is, the drone 200 may be equipped with mission equipment such as a camera (e.g., a stereo camera), and the drone 200 may generate photographing data on the wind turbine 100 via the camera and transmit it to the data collection module 310. In this case, the photographing data included in the sensing data SD may include image data and/or video data on each blade of the wind turbine 100.

As one example, the sensing data SD may include sensing data on a reference blade and sensing data on the other blades.

The data collection module 310 may transmit the received photographing data SD to other components in the blade modeling device 300. For example, the data collection module 310 may transfer the photographing data SD to the modeling module 320, etc., but the present disclosure is not limited thereto.

A variety of communication modules may be utilized in the data collection module 310, and data exchange between the drone 200 and the blade modeling device 300 may be performed via a communication network.

The modeling module 320 may generate a blade model (hereinafter referred to as "BM") based on the sensing data SD. In other words, the modeling module 320 may generate a blade model BM based on the sensing data SD transferred from the drone 200.

The blade model BM may include a reference blade model and an other blade model. The reference blade model may include modeling results regarding a reference blade, which is a blade whose angle with the ground is closest to the vertical out of the respective blades included in the wind turbine 100, and the other blade model may include modeling results regarding the other blades except for the reference blade out of the respective blades included in the wind turbine 100.

In this case, the blade model BM may include modeling results for each of a plurality of surfaces in each corresponding blade. In other words, the blade model BM may include modeling results for each of the plurality of surfaces included in the corresponding blade. To be more specific, the reference blade model may include modeling results for each surface included in the reference blade, and the other blade model may include modeling results for each surface included in the other blades.

In the following, a reference blade and the other blades included in a wind turbine 100 and a plurality of surfaces included in each blade will be described with reference to FIGS. 3a and 3b.

Figure 3A:
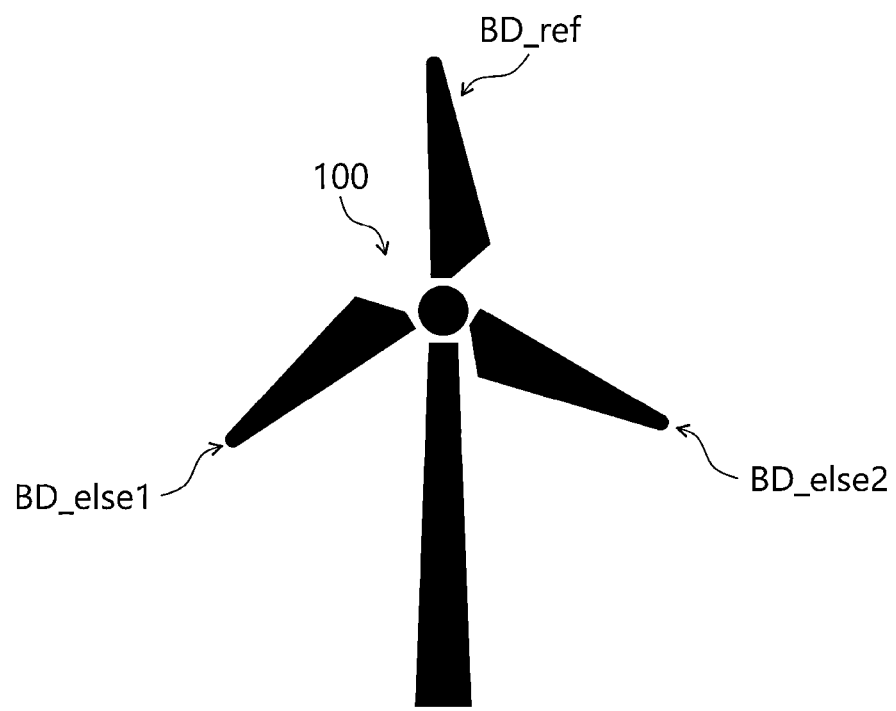
FIG. 3a is a diagram for describing a reference blade and the other blades in accordance with some embodiments of the present disclosure.

FIG. 3a is a diagram for describing a reference blade and the other blades in accordance with some embodiments of the present disclosure. FIG. 3b is a diagram for describing a plurality of surfaces included in a blade in accordance with some embodiments of the present disclosure.

Figure 3B:
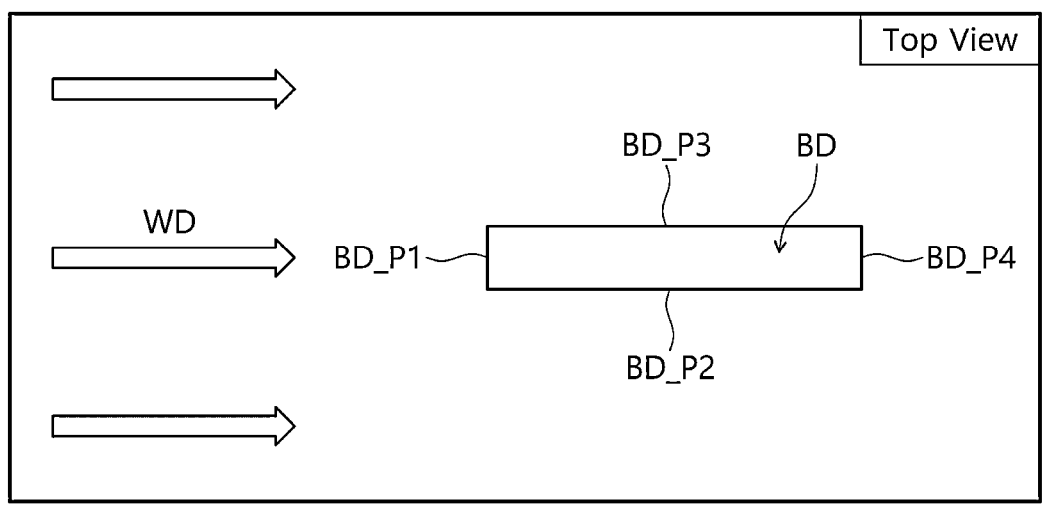
FIG. 3b is a diagram for describing a plurality of surfaces included in a blade in accordance with some embodiments of the present disclosure.

Referring to FIGS. 3a and 3b, the wind turbine 100 may include a plurality of blades.

As some examples, the wind turbine 100 may include one reference blade BD_ref and at least one other blade BD_else. FIG. 3a shows a first other blade BD_else1 and a second other blade BD_else2 as examples of the other blades BD_else, but embodiments of the present disclosure are not limited thereto, and the number of the other blades BD_else may be freely changed.

In this case, the reference blade BD_ref may include a blade whose angle with the ground is closest to the vertical among the respective blades included in the wind turbine 100. In other words, the reference blade BD_ref in the present disclosure can be defined as the blade disposed at the most perpendicular angle to the ground among the respective blades included in the wind turbine 100.

The other blades BD_else may include other blades except for the reference blade BD_ref out of the respective blades included in the wind turbine 100. In other words, the other blades BD_else in the present disclosure can be defined as the other blades except for the reference blade BD_ref out of the respective blades included in the wind turbine 100.

In this case, the reference blade model described above may include modeling results regarding the reference blade BD_ref of FIG. 3a, and the other blade model may include modeling results regarding the other blades BD_else of FIG. 3a.

The blades BD of the present disclosure including the reference blade BD_ref and the other blades BD_else may include a plurality of surfaces.

As some examples, the blade BD of the present disclosure may include a first surface BD_P1 to a fourth surface BD_P4.

In this case, the first surface BD_P1 included in the blade BD may be a surface located in front (front surface) based on the direction in which the wind blows, i.e., the wind direction (hereinafter referred to as "WD"), the second surface BD_P2 may be a surface located on the right side (right surface) based on the wind direction WD, the third surface BD_P3 may be a surface located on the left side (left surface) based on the wind direction WD, and the fourth surface BD_P4 may be a surface located in the rear (rear surface) based on the wind direction WD.

In the following, the surfaces located in the front surface, right surface, left surface, and rear surface in the blade BD based on the wind direction WD will be referred to as the first surface BD_P1 to the fourth surface BD_P4, respectively, for the convenience of description.

In this case, the blade model described above may include modeling results for each of the plurality of surfaces BD_P1 to BD_P4 of the corresponding blade BD. In other words, the blade model may include modeling results for each of the plurality of surfaces BD_P1 to BD_P4 included in the corresponding blade BD. To be more specific, the reference blade model may include modeling results for each of the four surfaces included in the reference blade BD_ref, and the other blade model may include modeling results for each of the four surfaces included in the other blades BD_else.

Referring again to FIGS. 1 and 2, the blade model BM may include a virtual straight line and/or a virtual coordinate system set for each corresponding blade. In other words, the blade model BM may be in the form of a virtual straight line or a virtual coordinate system set for the corresponding blade. In this case, the virtual coordinate system may be generated based on the virtual straight line.

As some examples, the blade model BM may be in the form of at least one virtual straight line set along each of the plurality of surfaces included in the corresponding blade and/or at least one virtual coordinate system for each of the plurality of surfaces determined based on the corresponding virtual straight line. As one example, the reference blade model may include at least one virtual straight line set along each of a plurality of surfaces included in the reference blade and a virtual coordinate system for each of the plurality of surfaces determined based on the corresponding virtual straight line. As another example, the other blade model may include at least one virtual straight line set along each of a plurality of surfaces included in the other blades and a virtual coordinate system for each of the plurality of surfaces determined based on the corresponding virtual straight line.

The modeling module 320 may generate a reference blade model using sensing data on the reference blade, predict the other blade model using the generated reference blade model, and then correct the other blade model prediction result using sensing data on the other blades.

In this case, the modeling module 320 may correct the modeling result for another surface included in the reference blade by using the modeling result for one surface included in that reference blade when generating the reference blade model. In other words, the modeling module 320 may correct the blade model for the second surface included in the reference blade by using the blade model for the first surface included in the reference blade.

In the following, the operation of the modeling module 320 of the present disclosure will be described in more detail with reference to FIG. 4.

Figure 4:
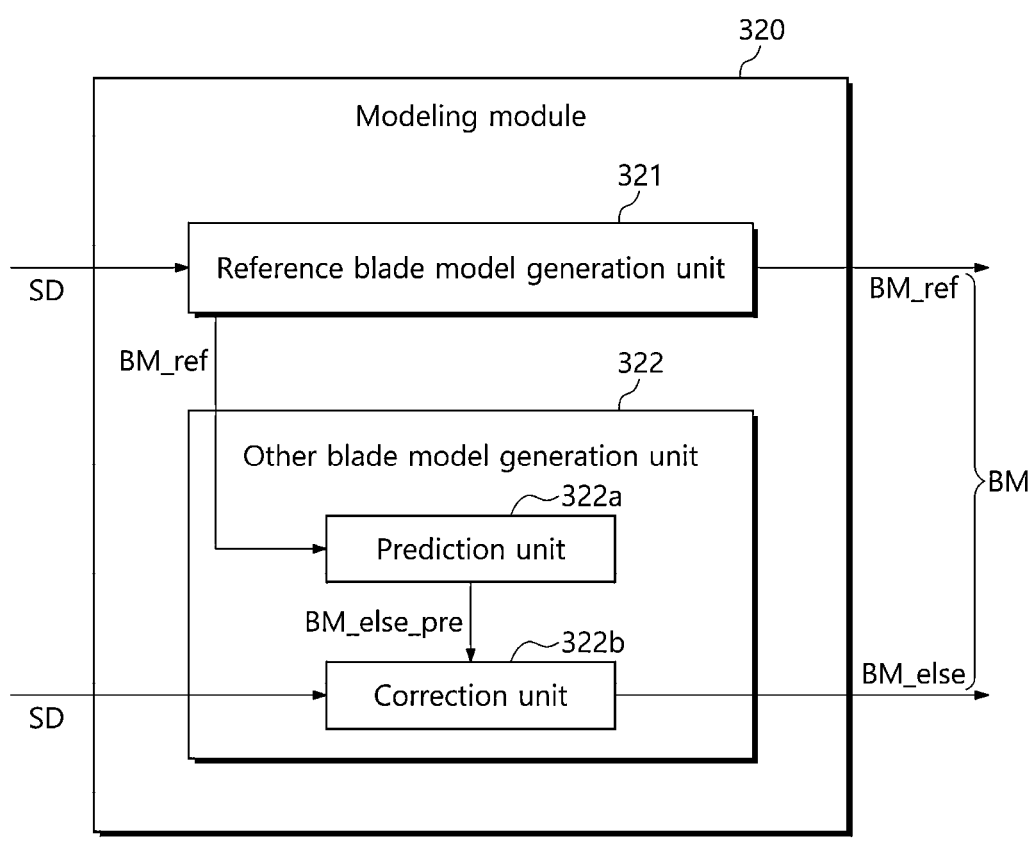
FIG. 4 is a detailed block diagram of the modeling module in accordance with some embodiments of the present disclosure.

FIG. 4 is a detailed block diagram of the modeling module in accordance with some embodiments of the present disclosure.

Referring to FIGS. 1 and 4, the modeling module 320 in accordance with some embodiments of the present disclosure may include a reference blade model generation unit 321 and an other blade model generation unit 322. The other blade model generation unit 322 may include a prediction unit 322a and a correction unit 322b.

The reference blade model generation unit 321 may generate a reference blade model BM_ref based on the sensing data SD on the reference blade. In this case, the sensing data SD on the reference blade may include photographing data on the reference blade. In other words, the sensing data SD on the reference blade may include image data and/or video data on the reference blade.

As some examples, the reference blade model generation unit 321 may perform modeling on each of the plurality of surfaces included in the reference blade based on the sensing data SD on the reference blade. In other words, the reference blade model generation unit 321 may perform modeling on each of the four surfaces included in the reference blade based on the sensing data SD on the reference blade.

In the following, the process of setting a virtual straight line for the reference blade will be described first, and then the process of setting a virtual coordinate system based on the corresponding virtual straight line will be described.

First, the reference blade model generation unit 321 may set a virtual straight line for one surface included in the reference blade. In other words, the reference blade model generation unit 321 may set a virtual straight line for a first measurement surface of the reference blade. In this case, the first measurement surface may refer to any one of the plurality of surfaces included in the reference blade (e.g., the first surface BD_P1 to the fourth surface BD_P4 in FIG. 3b).

As some examples, the reference blade model generation unit 321 may set a virtual straight line for the corresponding first measurement surface by measuring location data on the corresponding first measurement surface using the sensing data on the first surface of the reference blade out of the sensing data SD for the reference blade.

For example, the reference blade model generation unit 321 may set a virtual straight line for the first measurement surface of the reference blade by generating location data measurement results for a plurality of time points of the sensing data SD on the reference blade and combining the generated plurality of location data measurement results.

In the following, the process in which the reference blade model generation unit 321 sets a virtual straight line for the first surface of the reference blade will be described with reference to FIGS. 5 and 6. In this case, it will be described assuming a case where the first measurement surface of the reference blade is the front surface (first surface) of the reference blade for convenience of description.

Figure 5:
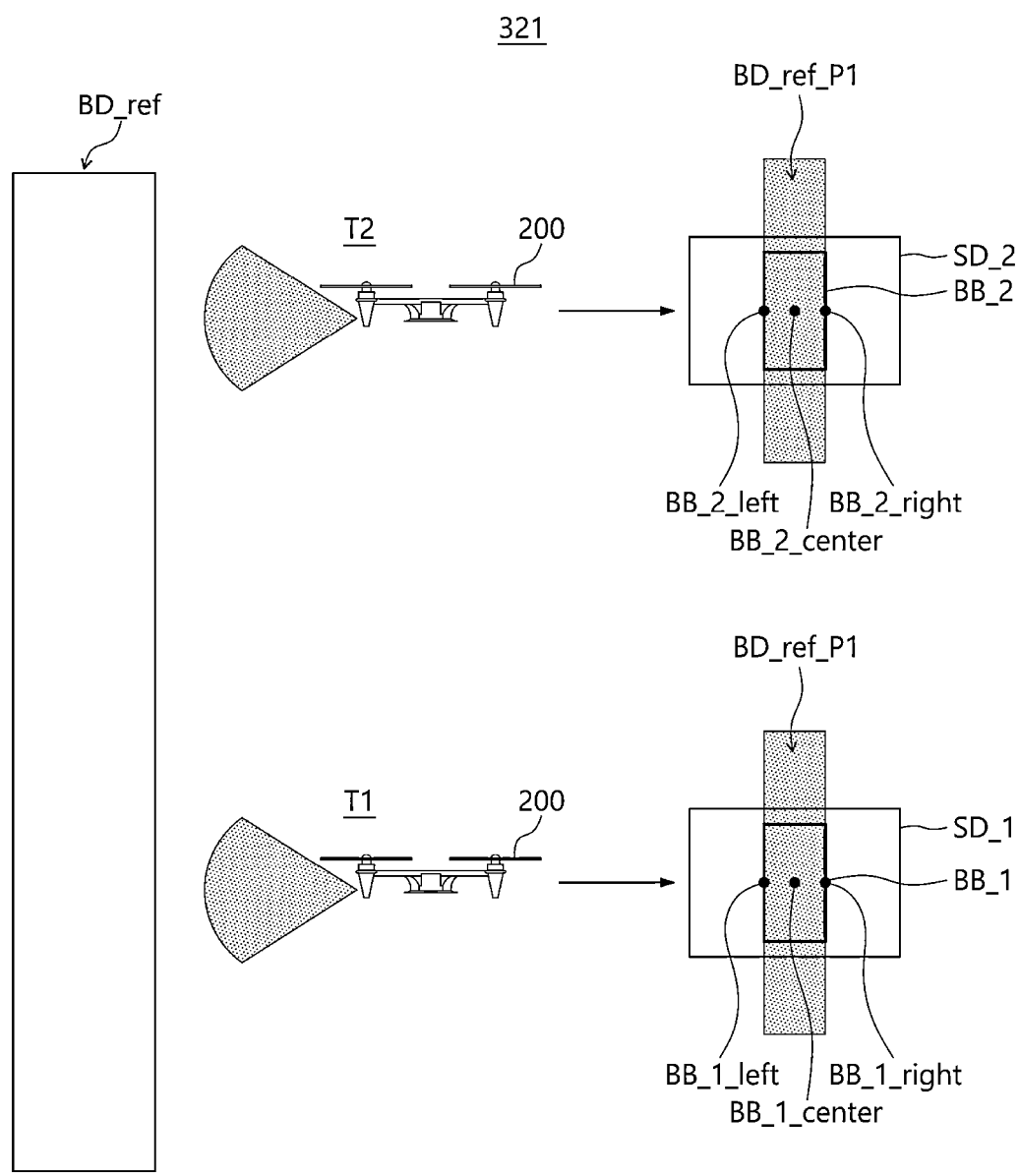
FIG. 5 is a diagram for describing a process of setting a virtual straight line for the first measurement surface included in the reference blade using the sensing data on the reference blade.

FIG. 5 is a diagram for describing a process of setting a virtual straight line for the first measurement surface included in the reference blade using the sensing data on the reference blade. FIG. 6 shows an example of a virtual straight line set for the first measurement surface of the reference blade. In this case, the first measurement surface of the reference blade is shown as the front surface (first surface) of the reference blade in FIGS. 5 and 6 for convenience of description, as described above.

Figure 6:
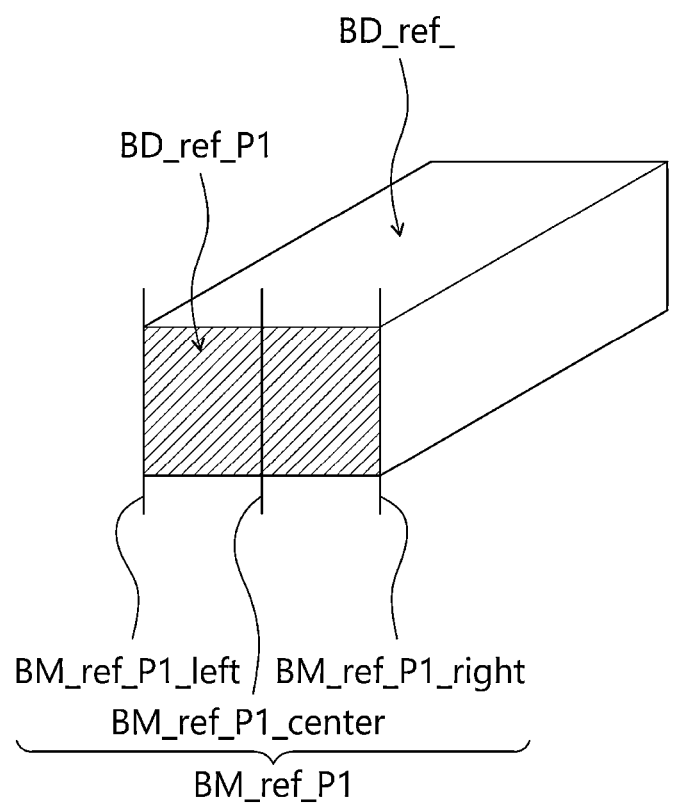
FIG. 6 shows an example of a virtual straight line set for the first measurement surface of the reference blade.

Referring to FIGS. 5 and 6, the reference blade model generation unit 321 may set a virtual straight line BM_ref_P1 for the first surface (front surface) BD_ref_P1 of the reference blade BD_ref based on the sensing data SD_1 and SD_2 at multiple time points T1 and T2 regarding the reference blade BD_ref.

In this case, the virtual straight line BM_ref_P1 for the first surface (front surface) BD_ref_P1 of the reference blade BD_ref may include a plurality of virtual straight lines. In other words, the virtual straight line BM_ref_P1 for the first surface (front surface) BD_ref_P1 of the reference blade BD_ref may include a left line BM_ref_P1_left, a center line BM_ref_P1_center, and a right line BM_ref_P1_right for the first surface (front surface) BD_ref_P1 of the reference blade BD_ref.

In the following, the process of setting the center line BM_ref_P1_center for the first surface (front surface) BD_ref_P1 of the reference blade BD_ref will be described specifically.

First, the reference blade model generation unit 321 may recognize a first blade box BB_1 from first sensing data SD_1 at a first time point T1 for the reference blade BD_ref. Thereafter, the reference blade model generation unit 321 may determine the center point BB_1_center of the first blade box BB_1. Thereafter, the reference blade model generation unit 321 may calculate the pixel coordinates of the center point BB_1_center. Thereafter, the reference blade model generation unit 321 may measure the location data of the corresponding center point BB_1_center by using the distance between the drone 200 and the center point BB_1_center measured by the stereo camera included in the drone 200 and the pixel coordinates of the center point BB_1_center. For convenience, the location data of the center point BB_1_center measured at the first time point T1 is referred to as the first location data.

Next, the reference blade model generation unit 321 may measure second location data, which is the location data of the center point BB_2_center measured at a second time point T2 through a process of recognizing a second blade box BB_1 from second sensing data SD_2 at the second time point T2 for the reference blade BD_ref, in a similar manner to measuring the first location data of the center point BB_1_center described above.

Next, the reference blade model generation unit 321 may set the center line BM_ref_P1_center for the first surface (front surface) BD_ref_P1 of the reference blade BD_ref by combining the first location data that is the location data of the center line at the first time point T1 and the second location data that is the location data of the center line at the second time point T2. For example, the reference blade model generation unit 321 may set the center line BM_ref_P1_center for the first surface (front surface) BD_ref_P1 of the reference blade BD_ref by using regression analysis using the first location data and the second location data.

On the other hand, the reference blade model generation unit 321 may set the left line BM_ref_P1_left and the right line BM_ref_P1_right for the first surface (front surface) BD_ref_P1 of the reference blade BD_ref in a similar manner to the process of setting the center line BM_ref_P1_center for the first surface (front surface) BD_ref_P1 of the reference blade BD_ref described above. That is, the reference blade model generation unit 321 may set the left line BM_ref_P1_left for the first surface (front surface) BD_ref_P1 of the reference blade BD_ref through the manner of using left center points BB_1_left and BB_2_left rather than the center points BB_1_center and BB_2_center in the blade boxes BB_1 and BB_2 recognized at each time point T1 and T2. In addition, the reference blade model generation unit 321 may set the right line BM_ref_P1_right for the first surface (front surface) BD_ref_P1 of the reference blade BD_ref through the manner of using right center points BB_1_right and BB_2_right rather than the center points BB_1_center and BB_2_center in the blade boxes BB_1 and BB_2 recognized at each time point T1 and T2.

Referring again to FIGS. 1 and 4, the reference blade model generation unit 321 may set a virtual straight line for a second measurement surface of the reference blade after the virtual straight line for the first measurement surface of the reference blade has been set. In this case, the second measurement surface may refer to any one of the plurality of surfaces included in the reference blade (e.g., the first surface BD_P1 to the fourth surface BD_P4 in FIG. 3b) except for the first measurement surface.

The reference blade model generation unit 321 may set a preliminary virtual straight line for the second measurement surface of the reference blade through a process similar to the process of setting a virtual straight line for the first measurement surface of the reference blade described above in FIG. 5. In other words, the reference blade model generation unit 321 may set a preliminary virtual straight line for the second measurement surface of the reference blade by performing the process of FIG. 5 described above on the sensing data for the second measurement surface of the reference blade rather than the sensing data for the first measurement surface of the reference blade.

Next, the reference blade model generation unit 321 may set a virtual straight line for the second measurement surface of the reference blade by correcting the preliminary virtual straight line for the second measurement surface using the preset virtual straight line for the first measurement surface of the reference blade.

For example, the reference blade model generation unit 321 may correct the preliminary virtual straight line using a parallel translation technique and/or an orthogonal projection technique based on the preset virtual straight line for the first surface of the reference blade.

In the following, the process of correcting the preliminary virtual straight line will be described in more detail with reference to FIGS. 7a and 7b. In this case, it will be described assuming a case where the first measurement surface of the reference blade is the front surface (the first surface) of the reference blade for convenience of description, as with FIGS. 5 and 6.

Figure 7A:
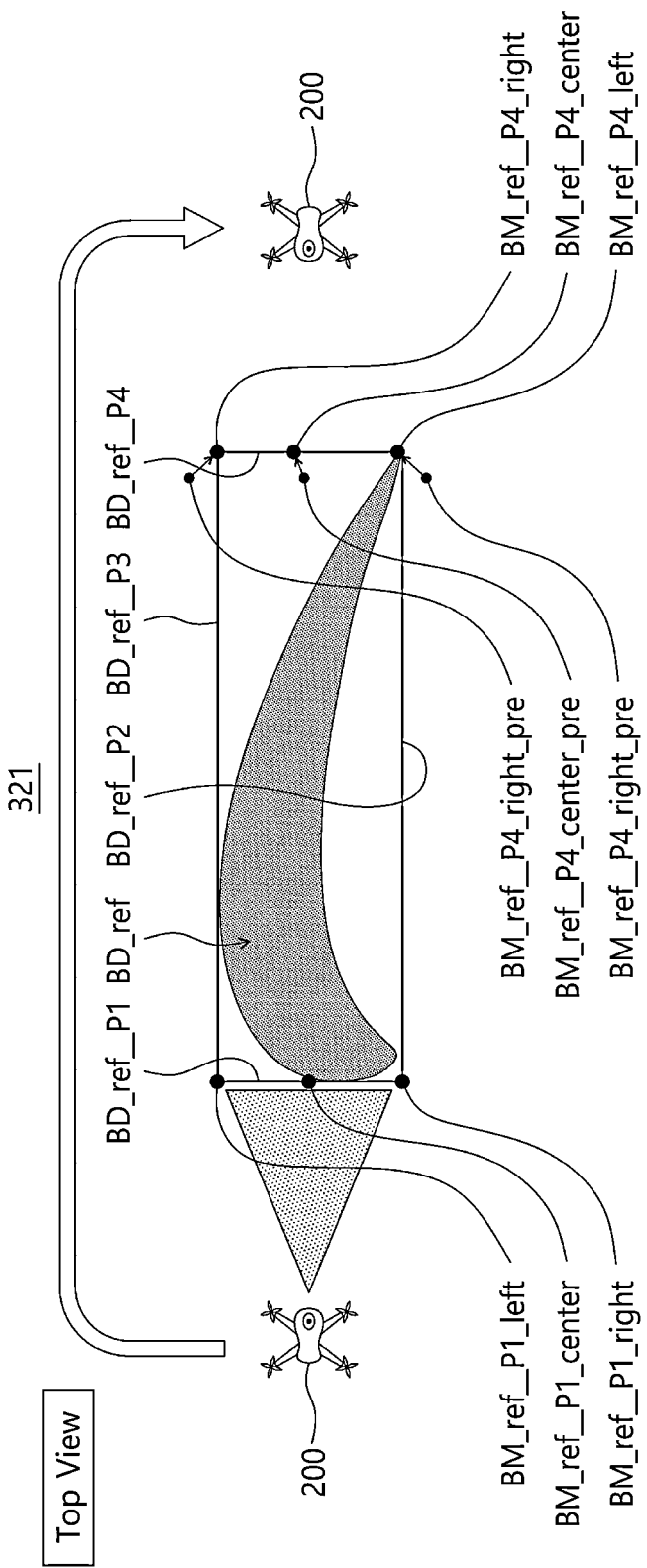
FIGS. 7a and 7b are diagrams for describing the process of correcting the virtual straight line of the second measurement surface of the reference blade using the virtual straight line of the first measurement surface of the reference blade.
Figure 7B:
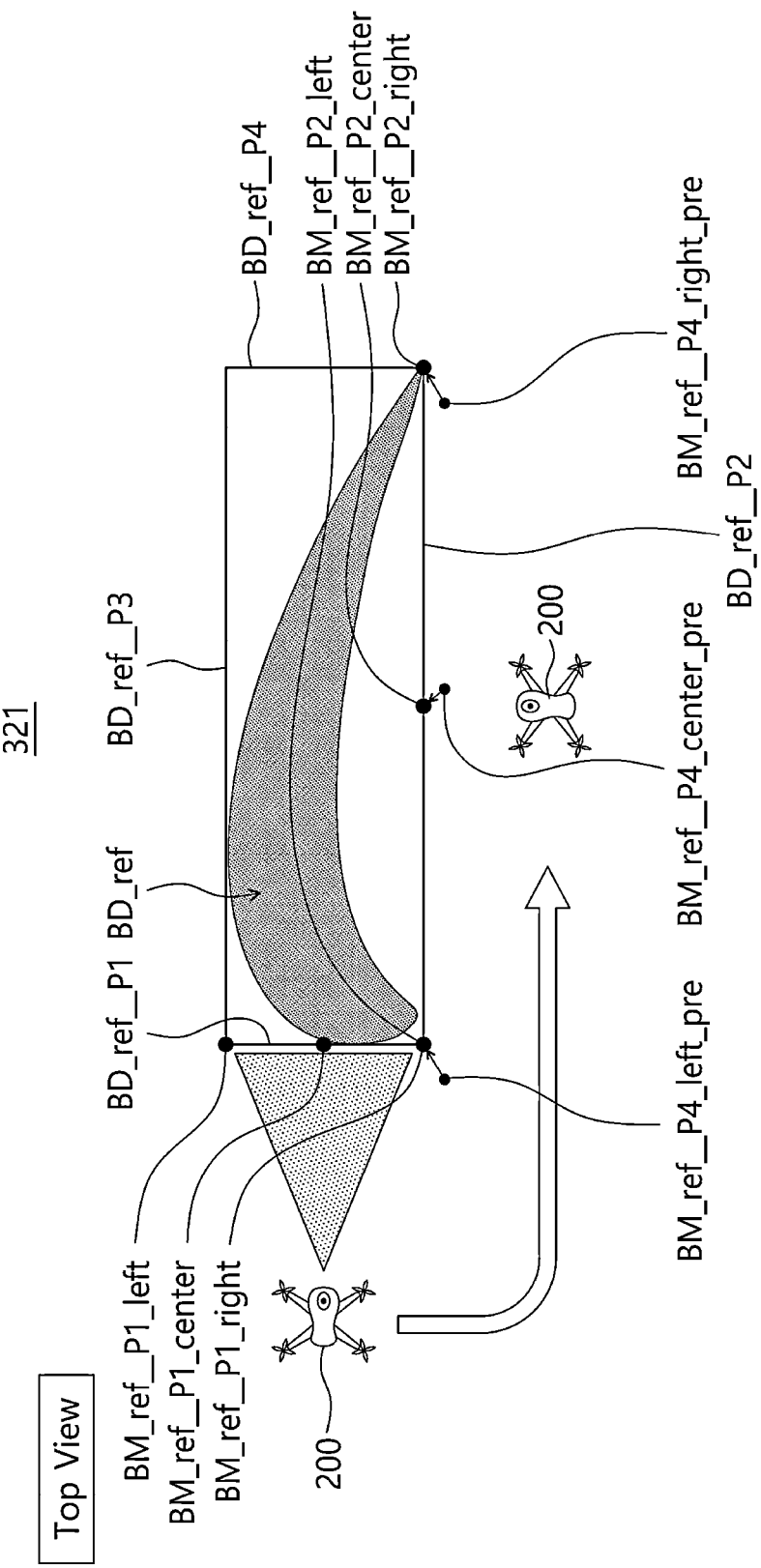

FIGS. 7a and 7b are diagrams for describing the process of correcting the virtual straight line of the second measurement surface of the reference blade using the virtual straight line of the first measurement surface of the reference blade.

In more detail, FIG. 7a shows a process of correcting a preliminary virtual straight line for the fourth surface (rear surface) BD_ref_P4 corresponding to the opposite surface based on the first surface (front surface) BD_ref_P1 of the reference blade BD_ref, and FIG. 7b shows a process of correcting a preliminary virtual straight line for the second surface (right surface) BD_ref_P2 corresponding to a side surface based on the first surface (front surface) BD_ref_P1 of the reference blade BD_ref. Specifically, FIG. 7a shows a process of setting a virtual straight line for the fourth surface (rear surface) BD_ref_P4 by correcting the preliminary virtual straight line for the fourth surface (rear surface) BD_ref_P4 using the virtual straight line for the first surface (front surface) BD_ref_P1 of the reference blade BD_ref, and FIG. 7b shows a process of setting a virtual straight line for the second surface (right surface) BD_ref_P2 by correcting the preliminary virtual straight line for the second surface (right surface) BD_ref_P2 using the virtual straight line for the first surface (front surface) BD_ref_P1 of the reference blade BD_ref.

In this case, the first measurement surface of the reference blade is shown as the front surface (first surface) of the reference blade in FIGS. 7a and 7b for convenience of description, as described above. In this case, FIG. 7a shows a case where the second measurement surface is the fourth surface (rear surface) BD_ref_P4, and FIG. 7b shows a case where the second measurement surface is the second surface (right surface) BD_ref_P2.

Referring to FIG. 7a, FIG. 7a shows the center line BD_ref_P1_center, left line BD_ref_P1_left, and right line BD_ref_P1_right for the first surface (front surface) BD_ref_P1 of the reference blade BD_ref that have been set through the process described above in FIG. 5, and also shows, in a similar manner, the preliminary virtual straight lines BD_ref_P4_center_pre, BD_ref_P4_left_pre, and BD_ref_P4_right_pre for the fourth surface (rear surface) BD_ref_P4 of the reference blade BD_ref that have been set through the process described above in FIG. 5.

The reference blade model generation unit 321 may correct the preliminary virtual straight lines BD_ref_P4_center_pre, BD_ref_P4_left_pre, and BD_ref_P4_right_pre for the fourth surface (rear surface) BD_ref_P4 of the reference blade BD_ref.

As some examples, the reference blade model generation unit 321 may generate virtual straight lines BM_ref_P4_center, BM_ref_P4_left, and BM_ref_P4_right for the fourth surface (rear surface) BD_ref_P4 of the reference blade BD_ref by correcting the preliminary virtual straight lines BD_ref_P4_center_pre, BD_ref_P4_left_pre, and BD_ref_P4_right_pre for the fourth surface (rear surface) BD_ref_P4 by using the virtual straight lines BD_ref_P1_center, BD_ref_P1_left, and BD_ref_P1_right for the first surface (front surface) BD_ref_P1 of the preset reference blade BD_ref.

For example, the reference blade model generation unit 321 may generate preliminary virtual straight lines BM_ref_P4_center, BM_ref_P4_left, and BM_ref_P4_right by using a parallel translation technique based on the virtual straight lines BD_ref_P1_center, BD_ref_P1_left, and BD_ref_P1_right for the first surface (front surface) BD_ref_P1 of the reference blade BD_ref.

To be more specific, the reference blade model generation unit 321 may set the right line BD_ref_P4_right for the fourth surface (rear surface) BD_ref_P4 by correcting the position of the preliminary right line BD_ref_P4_right_pre for the fourth surface (rear surface) BD_ref_P4 so as to be parallel to the left line BD_ref_P1_left for the first surface (front surface) BD_ref_P1 of the reference blade BD_ref, as shown in FIG. 7a.

Similarly, the reference blade model generation unit 321 may set the center line BD_ref_P4_center for the fourth surface (rear surface) BD_ref_P4 by correcting the position of the preliminary center line BD_ref_P4_center_pre for the fourth surface (rear surface) BD_ref_P4 so as to be parallel to the center line BD_ref_P1_center for the first surface (front surface) BD_ref_P1 of the reference blade BD_ref, as shown in FIG. 7a.

In addition, the reference blade model generation unit 321 may set the left line BD_ref_P4_left for the fourth surface (rear surface) BD_ref_P4 by correcting the position of the preliminary left line BD_ref_P4_left_pre for the fourth surface (rear surface) BD_ref_P4 so as to be parallel to the right line BD_ref_P1_right for the first surface (front surface) BD_ref_P1 of the reference blade BD_ref, as shown in FIG. 7a.

Referring to FIG. 7b, FIG. 7b shows the center line BD_ref_P1_center, left line BD_ref_P1_left, and right line BD_ref_P1_right for the first surface (front surface) BD_ref_P1 of the reference blade BD_ref that have been set through the process described above in FIG. 5, and also shows, in a similar manner, the preliminary virtual straight lines BD_ref_P2_center_pre, BD_ref_P2_left_pre, and BD_ref_P2_right_pre for the second surface (right surface) BD_ref_P2 of the reference blade BD_ref that have been set through the process described above in FIG. 5.

The reference blade model generation unit 321 may correct the preliminary virtual straight lines BD_ref_P2_center_pre, BD_ref_P2_left_pre, and BD_ref_P2_right_pre for the second surface (right surface) BD_ref_P2 of the reference blade BD_ref.

As some examples, the reference blade model generation unit 321 may generate virtual straight lines BM_ref_P2_center, BM_ref_P2_left, and BM_ref_P2_right for the second surface (right surface) BD_ref_P2 of the reference blade BD_ref by correcting the preliminary virtual straight lines BD_ref_P2_center_pre, BD_ref_P2_left_pre, and BD_ref_P2_right_pre for the second surface (right surface) BD_ref_P2 by using the virtual straight lines BD_ref_P1_center, BD_ref_P1_left, and BD_ref_P1_right for the first surface (front surface) BD_ref_P1 of the preset reference blade BD_ref.

For example, the reference blade model generation unit 321 may generate preliminary virtual straight lines BM_ref_P2_center, BM_ref_P2_left, and BM_ref_P2_right by using an orthogonal projection technique based on any one of the virtual straight lines BD_ref_P1_center, BD_ref_P1_left, and BD_ref_P1_right for the first surface (front surface) BD_ref_P1 of the reference blade BD_ref.

To be more specific, the reference blade model generation unit 321 may set virtual straight lines BD_ref_P2_center, BD_ref_P2_left, and BD_ref_P2_right for the second surface (right surface) BD_ref_P2 by orthogonally projecting the positions of the preliminary virtual straight lines BD_ref_P2_center_pre, BD_ref_P2_left_pre, and BD_ref_P2_right_pre for the second surface (right surface) BD_ref_P2 onto a plane corresponding to the right line BD_ref_P1_right for the first surface (front surface) BD_ref_P1 of the reference blade BD_ref, as shown in FIG. 7b.

Referring again to FIGS. 1 and 4, the reference blade model generation unit 321 may set preliminary virtual straight lines for the other surfaces (a third measurement surface, a fourth measurement surface) of the reference blade through a manner similar to the one described above, and then set virtual straight lines for the corresponding surfaces (the third measurement surface, the fourth measurement surface) by correcting the corresponding preliminary virtual straight lines.

Through this process, the reference blade model generation unit 321 may generate eight virtual straight lines for the reference blade as the reference blade model BM_ref. In other words, the reference blade model BM_ref generated by the reference blade model generation unit 321 may include eight virtual straight lines. Specifically, the reference blade model generation unit 321 may set three virtual straight lines for each surface of the reference blade, but since some of these overlap (e.g., the right line of the first surface (front surface) and the left line of the second surface (right surface) overlap), the reference blade model BM_ref generated by the reference blade model generation unit 321 will include eight virtual straight lines if the number of these overlapping parts is subtracted.

On the other hand, once the virtual straight lines for the reference blade are set through the process described above, the reference blade model generation unit 321 may set a virtual coordinate system for the reference blade based on the virtual straight lines. In this case, the virtual coordinate system may be set for each of the plurality of surfaces included in the reference blade (e.g., each of the first surface (front surface) to the fourth surface (rear surface)), as with the virtual straight lines.

As some examples, the reference blade model generation unit 321 may set a virtual coordinate system with the point where the nose of the wind turbine 100 and one of the plurality of virtual straight lines for one surface of the reference blade intersect as the origin and the corresponding virtual straight line as one axis (e.g., the Z axis).

For example, the reference blade model generation unit 321 may set a virtual coordinate system with the point where the nose of the wind turbine 100 and the center line for the first surface (front surface) of the reference blade intersect as the origin and the corresponding center line as one axis (e.g., the Z axis).

Accordingly, the reference blade model BM_ref generated by the reference blade model generation unit 321 may include four virtual coordinate systems. In other words, a virtual coordinate system is generated based on the center line of the virtual straight lines, and since one center line is set for each of the first surface (front surface) to the fourth surface (rear surface) in the reference blade, the reference blade model BM_ref will include four virtual coordinate systems.

In the following, the virtual coordinate system set for the first surface (front surface) of the reference blade will be described with reference to FIG. 8.

Figure 8:
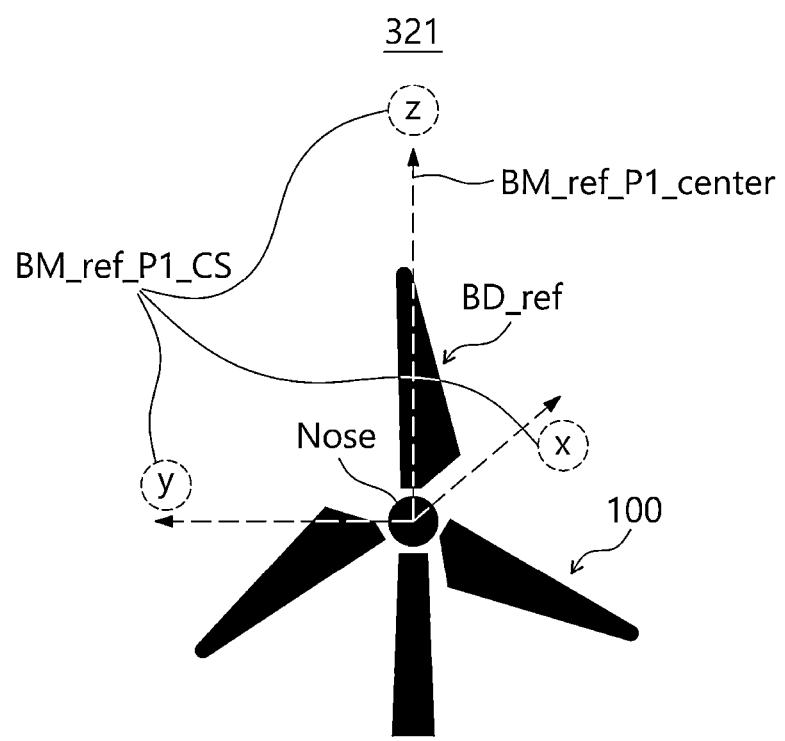
FIG. 8 shows an example of a virtual coordinate system set for the first surface (front surface) of the reference blade.

FIG. 8 shows an example of a virtual coordinate system set for the first surface (front surface) of the reference blade.

Referring to FIG. 8, FIG. 8 shows a virtual coordinate system BM_ref_P1_cs set for the first surface (front surface) of the reference blade BD_ref. In this case, the first surface of the reference blade BD_ref shown in FIG. 8 may be the front surface of the reference blade BD_ref based on the wind direction (WD in FIG. 3b) as described above.

As some examples, the reference blade model generation unit 321 may set a virtual coordinate system BM_ref_P1_cs with the point where the nose Nose of the wind turbine 100 and the center line BM_ref_P1_center for the first surface (front surface) of the reference blade BD_ref intersect as the origin and the corresponding center line BM_ref_P1_center as one axis (Z-axis).

In other words, the virtual coordinate system BM_ref_P1_cs set by the reference blade model generation unit 321 for the first surface (front surface) of the reference blade BM_ref may be a coordinate system with the point where the nose Nose of the wind turbine 100 and the center line BM_ref_P1_center for the first surface (front surface) of the reference blade BD_ref intersect as the origin and the corresponding center line BM_ref_P1_center as one axis (Z-axis).

FIG. 8 shows only the virtual coordinate system for the first surface (front surface) of the reference blade BD_ref, but this is merely for the convenience of description, and the reference blade model BM_ref may include a plurality of virtual coordinate systems set for each of the first surface (front surface) to the fourth surface (rear surface), as described above.

Referring again to FIGS. 1 and 4, the other blade model generation unit 322 may generate an other blade model BM_else based on the sensing data SD on the other blades and the reference blade model BM_ref. In this case, the sensing data SD on the other blades may include photographing data on the other blades. In other words, the sensing data SD on the other blades may include image data and/or video data on the other blades.

Specifically, the other blade model generation unit 322 may include a prediction unit 322a and a correction unit 322b.

The prediction unit 322a may generate a preliminary other blade model BM_else_pre based on the reference blade model BM_ref. In this case, the reference blade model BM_ref that the prediction unit 322a receives from the reference blade model generation unit 321 and uses may be in the form of a virtual coordinate system.

As some examples, the prediction unit 322a may generate a preliminary other blade model BM_else_pre by rotating the virtual coordinate system, which is the reference blade model BM_ref, by a predetermined angle.

For example, the prediction unit 322a may generate the preliminary other blade model BM_else_pre through a mathematical expression regarding a rotation matrix such as <Mathematical Expression 1> below, but embodiments of the present disclosure are not limited thereto.

$$V_{0\_front} = R_{1-front}^{0-front} \cdot V_{1\_front}$$ ⟨Mathematical Expression 1⟩

$$R_{1-front}^{0-front} = R_x(\emptyset) \cdot R_y(\theta) \cdot R_z(\varphi)$$

In <Mathematical Expression 1>, $V_{0\_front}$ denotes a position vector expressed in the virtual coordinate system for the first surface (front surface) of a first other blade (BD_else1 in FIG. 3a) of the other blades, $V_{1\_front}$ denotes a position vector expressed in the virtual coordinate system for the first surface (front surface) of the reference blade, $R_{1-front}^{0-front}$ denotes a rotation matrix that transforms the virtual coordinate system for the first surface (front surface) of the reference blade into the virtual coordinate system for the first surface (front surface) of the first other blade (BD_else1 in FIG. 3a), $R_x(\emptyset)$ denotes an x-axis rotation matrix that rotates an angle of Ø around the x-axis in the virtual coordinate system, $R_y(\theta)$ denotes a y-axis rotation matrix that rotates an angle of θ around the y-axis in the virtual coordinate system, and $R_z(\varphi)$ denotes a z-axis rotation matrix that rotates an angle of φ around the z-axis in the virtual coordinate system. Here, Ø, θ, and φ represent the x-axis rotation angle, y-axis rotation angle, and z-axis rotation angle, respectively.

For example, the prediction unit 322a may generate the preliminary other blade model BM_else_pre by rotating the reference blade model BM_ref by 120° around the x-axis, which is one axis constituting the corresponding reference blade model BM_ref.

In other words, the prediction unit 322a may generate a first other blade model (BD_else1 in FIG. 3a) by rotating the reference blade model BM_ref by −120° around the x-axis, and may generate a second other blade model (BD_else2 in FIG. 3a) by rotating the reference blade model BM_ref by 120° or −240° around the x-axis. That is, the x-axis rotation angle Ø in this case may include 120°, −120°, 240°, etc.

The correction unit 322b may generate the other blade model BM_else by correcting the preliminary other blade model BM_else_pre using the sensing data SD on the other blades.

For example, the correction unit 322b may correct each rotation angle Ø, θ, and φ of the rotation matrix $R_{1-front}^{0-front}$ in <Mathematical Expression 1> described above by using the sensing data SD on the other blades.

In this case, the correction unit 322b may generate the other blade model BM_else by correcting the preliminary other blade model BM_else_pre using a predetermined correction algorithm. As one example, the correction algorithm may be an algorithm based on the recursive least squares method, but embodiments of the present disclosure are not limited thereto.

To be more specific, the correction unit 322b may determine a measurement error, which denotes a difference between a location data measurement result generated using the sensing data SD on the other blades and a model match point (having the same z value as the location data measurement result) corresponding to the location data measurement result, and generate a correction model related to the determined measurement error. In this case, the state variables of the correction model can be defined by the x-axis rotation angle Ø and the y-axis rotation angle θ (since the difference in the z position is not large according to the change in the slope). Next, the correction unit 322b may estimate the state variables of the correction model (change in the x-axis rotation angle Ø and change in the y-axis rotation angle θ) by using a predefined algorithm related to a differential matrix calculated by differentiating the corresponding correction model and a Kalman gain K every time the location data measurement result generated using the sensing data SD on the other blades is measured. In this case, the predefined algorithm may be an algorithm related to a Kalman filter, but embodiments of the present disclosure are not limited thereto. Next, the correction unit 322b may generate the other blade model BM_else by correcting the preliminary other blade model BM_else_pre using the estimated state variables (change in the x-axis rotation angle Ø and change in the y-axis rotation angle θ)

In the following, an example of an other blade model BM_else generated by the other blade model generation unit 322 will be described with further reference to FIG. 9.

Figure 9:
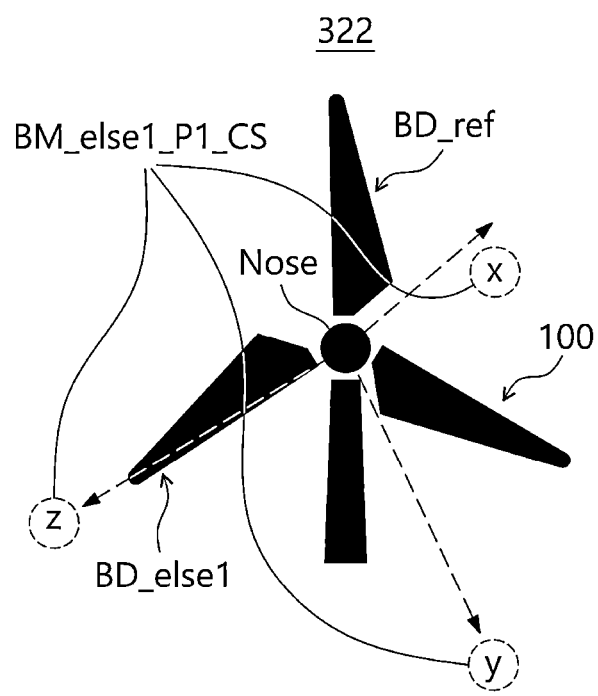
FIG. 9 shows an example of an other blade model for the first surface (front surface) of the first other blade predicted based on the first surface (front surface) of the reference blade.

FIG. 9 shows an example of an other blade model for the first surface (front surface) of the first other blade predicted based on the first surface (front surface) of the reference blade.

Referring to FIGS. 4 and 9, FIG. 9 shows a blade model BM_else1_P1_cs in the form of a virtual coordinate system for the first surface (front surface) of the first other blade BD_else1 generated by the other blade model generation unit 322 through the process described above.

In this case, the other blade model BM_else1_P1_cs shown in FIG. 9 may be an other blade model generated based on the first surface (front surface) of the reference blade as described above.

FIG. 9 shows only the blade model BM_else1_P1_cs for the first surface of the first other blade BD_else1 for convenience of description, but the other blade model for the first other blade BD_else1 also includes blade models for the second surface (right surface) to the fourth surface (rear surface) of the first other blade BD_else1 as a matter of course, as described above.

Referring again to FIGS. 1 and 4, the modeling module 320 may output the blade model BM including the generated reference blade model BM_ref and other blade model BM_else.

Through this process, the blade model BM generated by the modeling module 320 may include 24 virtual straight lines and 12 virtual coordinate systems in total. That is, as described above, since the wind turbine 100 may include three blades and 8 virtual straight lines and 4 virtual coordinate systems may be set for each blade, the blade model BM can include 24 virtual straight lines and 12 virtual coordinate systems in total. However, this is merely for convenience of description, any of the virtual straight lines and virtual coordinate systems included in the blade model BM may be omitted, and the number of virtual straight lines and virtual coordinate systems may also be freely reduced and/or modified.

In this way, the modeling module 320 in accordance with some embodiments of the present disclosure have a novel effect of being able to inspect all blades of the wind turbine 100 at once through a blade modeling process even when a small drone 200 equipped with limited sensors is used.

Specifically, the modeling module 320 can make up for the insufficient sensing capabilities of a small drone 200 equipped with limited sensors (e.g., a stereo camera) by modeling the reference blade model, then predicting modeling results for the other blades through the reference blade model, and correcting the predicted values through sensing data on the other blades.

In this case, the modeling module 320 can express the three-dimensional shape of a blade by modeling the blade as a plurality of straight lines (e.g., eight straight lines) rather than a single straight line, and thus the modeling accuracy can be improved.

Further, the modeling module 320 can overcome the difficulty of the blade modeling process due to the cone angle, tilt angle, etc., through the modeling results for each surface of the reference blade.

In the following, the effects by the modeling process of the modeling module 320 of the present disclosure will be described with reference to FIG. 10.

Figure 10:
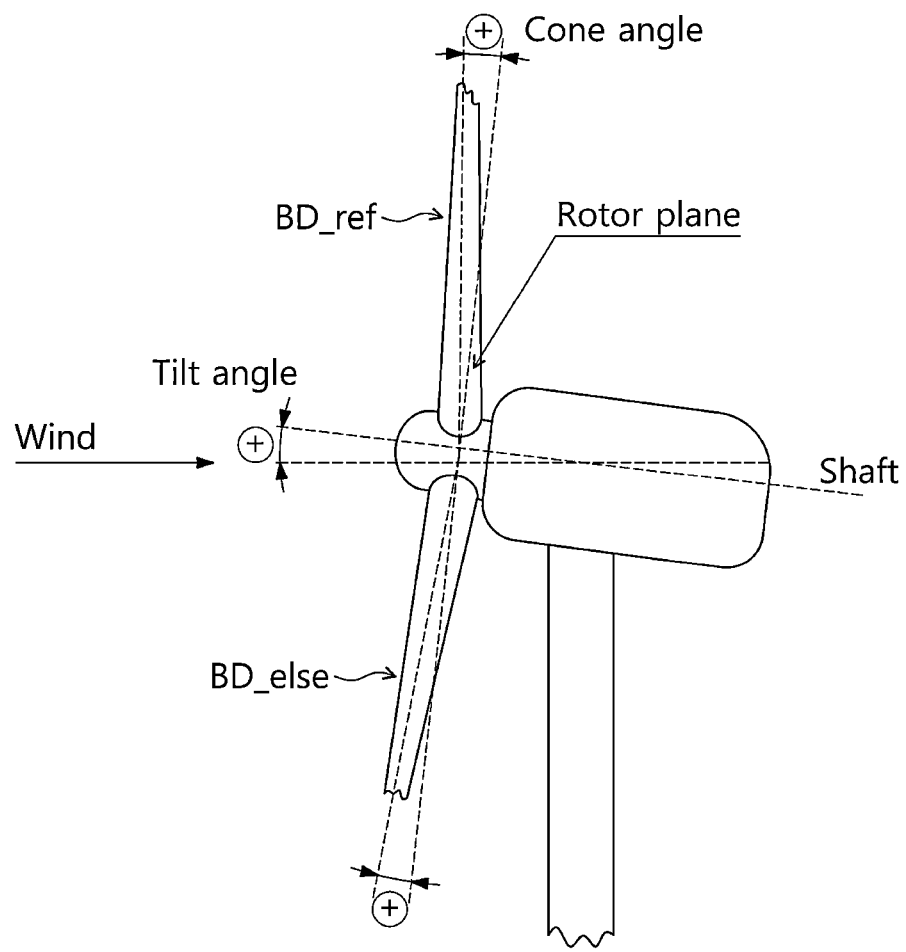
FIG. 10 is a diagram for describing the effects of the blade modeling process of the present disclosure.

FIG. 10 is a diagram for describing the effects of the blade modeling process of the present disclosure.

Referring to FIGS. 1, 4, and 10, the blade modeling device 300 including the modeling module 320 in accordance with some embodiments of the present disclosure can perform blade modeling that reflects various parameters of each blade BD_ref and BD_else.

That is, in the case of a typical blade modeling method, only the roll direction rotation angle of the blades BD_ref and BD_else (blade angle, the angle between the blade and the ground when observing the wind turbine 100 from the front) can be reflected.

However, in the case of the modeling module 320 in accordance with some embodiments of the present disclosure, it is possible to perform blade modeling that reflects not only the roll direction rotation angle, but also various parameters such as the cone angle related to the rotor plane of each blade BD_ref and BD_else, and the tilt angle related to the shaft.

Accordingly, the blade modeling device 300 including the modeling module 320 in accordance with some embodiments of the present disclosure can further improve the accuracy in the blade modeling process.

Referring again to FIGS. 1 and 2, the reference location calculation module 330 may calculate the reference location (hereinafter referred to as "RL") between the drone 200 and the wind turbine 100 based on the generated blade model BM. In this case, the reference location RL may refer to the location of the drone 200 based on a particular surface included in any one blade of the wind turbine 100.

In the following, the process of determining the reference location between the first surface (front surface) of the first other blade and the drone 200 will be described as an example for convenience of description.

As some examples, the reference location calculation module 330 may calculate the reference location RL based on the blade model BM expressed in the form of a virtual coordinate system for the first surface (front surface) of the first other blade, and the inertial coordinate system in which the GPS location measured by a GPS sensor or the like of the drone 200 is defined.

To be more specific, first, the reference location calculation module 330 may calculate the location of the drone 200 in the virtual coordinate system for the first surface (front surface) of the first other blade. In other words, the reference location calculation module 330 may determine a virtual location of the drone 200 by converting the location (GPS location) of the drone 200 defined in the inertial coordinate system based on the corresponding virtual coordinate system.

Next, the reference location calculation module 330 may determine a reference location in the virtual coordinate system based on a point having the same z-coordinate as the determined virtual location of the drone 200. In other words, the reference location calculation module 330 may search for a point having the same z value as the virtual location in the virtual coordinate system of the first surface (front surface) of the first other blade, and determine the reference location in the virtual coordinate system based on the corresponding point. Accordingly, the reference location in the virtual coordinate system may be expressed in the form of (x1, y1, 0), etc. In other words, the z value of the reference location in the virtual coordinate system may be 0.

Next, the reference location calculation module 330 may calculate a final reference location RL by converting the determined reference location (x1, y1, 0) in the virtual coordinate system into the inertial coordinate system.

Figure 11:
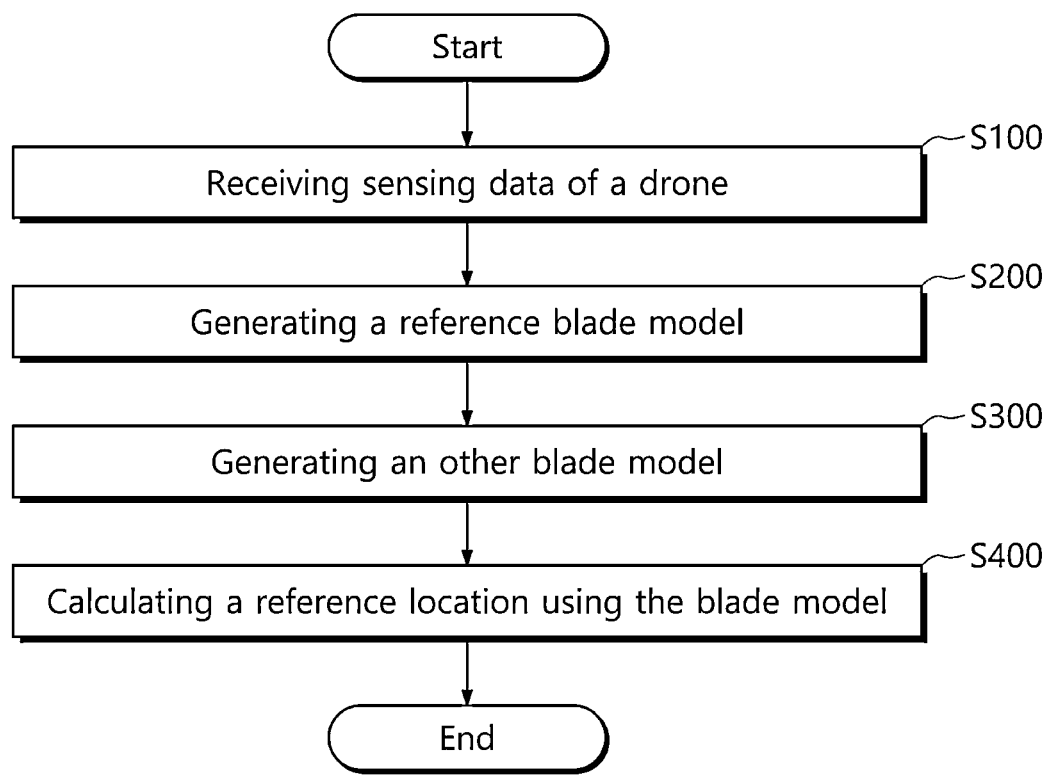
FIG. 11 is a flowchart of a method for modeling blades in accordance with some embodiments of the present disclosure.

FIG. 11 is a flowchart of a method for modeling blades in accordance with some embodiments of the present disclosure. Each step (S100 to S400) of FIG. 11 may be performed by the blade modeling device 300 of FIG. 1 and FIG. 2. In the following, a description will be made briefly, with any overlapping contents excluded.

Referring to FIGS. 1, 2, 4, and 11, first, sensing data of a drone may be received (S100).

As some examples, the data collection module 310 may collect sensing data SD of the drone 200 for the wind turbine 100. In other words, the data collection module 310 may receive the sensing data SD on the wind turbine 100 from the drone 200.

The sensing data SD may include photographing data on the wind turbine 100. In other words, the sensing data SD may include data obtained by photographing the wind turbine 100 by the drone 200. That is, the drone 200 may be equipped with mission equipment such as a camera (e.g., a stereo camera), and the drone 200 may generate photographing data on the wind turbine 100 via the camera and transmit it to the data collection module 310. In this case, the photographing data included in the sensing data SD may include image data and/or video data on each blade of the wind turbine 100.

As one example, the sensing data SD may include sensing data on a reference blade and sensing data on the other blades.

Next, a reference blade model may be generated (S200).

As some examples, the reference blade model generation unit 321 may generate a reference blade model BM_ref based on the sensing data SD on the reference blade.

As some examples, the reference blade model generation unit 321 may perform modeling on each of the plurality of surfaces included in the reference blade based on the sensing data SD on the reference blade. In other words, the reference blade model generation unit 321 may perform modeling on each of the four surfaces included in the reference blade based on the sensing data SD on the reference blade.

In this case, the reference blade model BM_ref may include a virtual straight line regarding the reference blade and/or a virtual coordinate system regarding the reference blade, as described above, and in this case, the virtual coordinate system may be generated based on the virtual straight line.

As one example, the reference blade model generation unit 321 may generate eight virtual straight lines for the reference blade as the reference blade model BM_ref. In other words, the reference blade model BM_ref generated by the reference blade model generation unit 321 may include eight virtual straight lines. Specifically, the reference blade model generation unit 321 may set three virtual straight lines for each surface of the reference blade, but since some of these overlap (e.g., the right line of the first surface (front surface) and the left line of the second surface (right surface) overlap), the reference blade model BM_ref generated by the reference blade model generation unit 321 will include eight virtual straight lines if the number of these overlapping parts is subtracted.

As another example, the reference blade model generation unit 321 may generate four virtual coordinate systems for the reference blade as the reference blade model BM_ref. That is, the reference blade model BM_ref generated by the reference blade model generation unit 321 may include four virtual coordinate systems. In other words, a virtual coordinate system is generated based on the center line of the virtual straight lines, and since one center line is set for each of the first surface (front surface) to the fourth surface (rear surface) in the reference blade, the reference blade model BM_ref will include four virtual coordinate systems.

Next, an other blade model may be generated (S300).

As some examples, the other blade model generation unit 322 may generate an other blade model BM_else based on the sensing data SD on the other blades and the reference blade model BM_ref.

For example, the other blade model generation unit 322 may generate a preliminary other blade model BM_else_pre by predicting the other blade model using the generated reference blade model BM_ref, and generate the other blade model BM_else by correcting the preliminary other blade model BM_else_pre based on sensing data SD on the other blades.

In this case, the other blade model generation unit 322 may generate the preliminary other blade model BM_else_pre by using a rotation matrix such as <Mathematical Expression 1> described above, and generate the other blade model BM_else by correcting the preliminary other blade model BM_else_pre using a correction algorithm based on the recursive least squares method or the like.

Next, a reference location may be calculated using the blade model (S400).

As some examples, the reference location calculation module 330 may calculate the reference location RL based on the blade model BM expressed in the form of a virtual coordinate system for the first surface (front surface) of the first other blade, and the inertial coordinate system in which the GPS location measured by a GPS sensor or the like of the drone 200 is defined.

A detailed description will be omitted.

Figure 12:
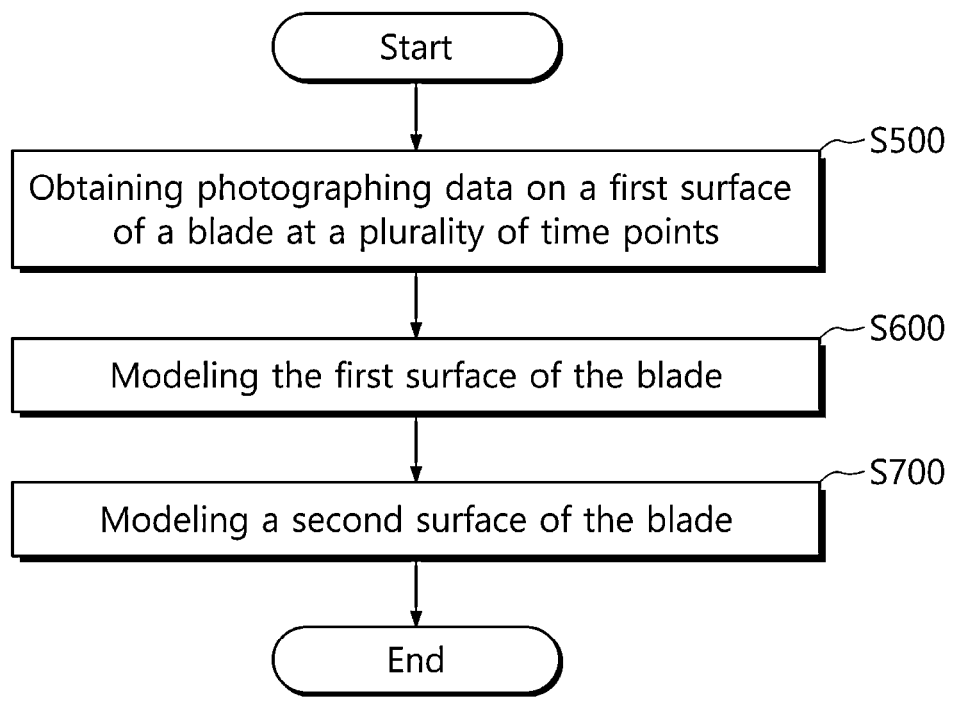
FIG. 12 is a flowchart of a method for modeling blades in accordance with some other embodiments of the present disclosure.

FIG. 12 is a flowchart of a method for modeling blades in accordance with some other embodiments of the present disclosure. Each step of FIG. 12 may be performed by the drone 200 or the blade modeling device 300. For convenience, it will be described that the drone 200 performs each step in FIG. 12. In the following, a description will be made briefly, with any overlapping contents excluded.

The drone 200 may model the blades of a wind turbine. The wind turbine includes at least one blade. The drone 200 may model all the blades by applying the results of modeling one blade to the other blades.

To be more specific by referring to FIGS. 1, 2, and 12, first, photographing data on a first surface of a blade may be obtained at a plurality of time points (S500).

As some examples, the drone 200 may obtain photographing data on the first surface of the blade at a plurality of time points.

For example, the drone 200 may obtain image data by photographing the first surface while flying along the first surface of the blade.

The drone 200 may model the first surface as a virtual straight line for the first surface. In other words, the result obtained by modeling the first surface of the blade by the drone 200 may be in the form of a virtual straight line. In this case, the virtual straight line can be represented by the following <Mathematical Expression 2>.

$$p = p_0 + tu \quad \text{<Mathematical Expression 2>}$$

In this case, in <Mathematical Expression 2>, $p_0=(x_0, y_0, z_0)$ is a reference point, and u is a unit vector representing the slope of the virtual straight line. Here, t is a scalar parameter. The reference point is the average of a plurality of location data obtained from the photographing data.

Further, u may be determined as the left singular vector corresponding to the largest singular value by performing the singular value decomposition (SVD) on the matrix representing the difference between the location data and p0.

Next, the first surface of the blade may be modeled (S600).

As some examples, the drone 200 may generate at least one virtual straight line for the first surface of the blade. As one example, the drone 200 may model the first surface by generating a center line, a left line, and a right line for the first surface of the blade.

In this case, the drone 200 may generate a virtual straight line representing the center line by using the center points of a blade box recognized in the image data, generate a virtual straight line representing the left line by using the center points of the left edge of the blade box, and generate a virtual straight line representing the right line by using the center points of the right edge of the blade box. The blade box represents the blade recognized in the image data.

Next, the drone 200 may model a second surface of the blade (S700).

As some examples, the drone 200 may model the second surface as a virtual straight line parallel to the virtual straight line for the first surface or a virtual straight line orthogonally projected onto the virtual straight line for the first surface.

If the second surface is the left surface of the first surface, the drone 200 may model the second surface by orthogonally projecting the center line, right line, and left line of the first surface onto the second surface based on the right line of the second surface. If the second surface is the right surface of the first surface, the drone 200 may model the second surface by orthogonally projecting the center line, right line, and left line of the first surface onto the second surface based on the left line of the second surface. If the second surface is the rear surface of the first surface, the drone 200 may model the second surface so that the center lines, right lines, and left lines of the first surface and the second surface are parallel.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

The invention claimed is:

1. A device for modeling blades comprising:
a processor configured to:
receive sensing data of a drone for a reference blade included in a wind turbine; and
generate a blade model by performing modeling on the wind turbine based on the sensing data,
wherein when generating the blade model, the processor is further configured to:
generate a reference blade model by performing modeling on the reference blade, and
generate another blade model for at least one other blade included in the wind turbine based on the reference blade model, and
wherein the blade model comprises at least one of virtual straight line set along each of a plurality of surfaces included in the blade and a virtual coordinate system for each of the plurality of surfaces determined based on the virtual straight line,
wherein the sensing data comprises photographing data captured by a camera included in the drone, and
wherein the processor is further configured to:
measure location data on a first measurement surface included in the reference blade using the photographing data, and
set a virtual straight line for the first measurement surface based on the measured location data on the first measurement surface,
wherein the processor is further configured to:
based on a first time point of the photographing data, recognize a blade box from the photographing data,
determine a center point of the recognized blade box,
measure first location data, which is location data of the determined center point, and
set a center line, which is a virtual straight line for the first measurement surface, based on the first location data.

2. The device for modeling blades of claim 1, wherein the processor is further configured to:
based on a second time point different from the first time point,
recognize a blade box from the photographing data,
determine a center point of the recognized blade box,
measure second location data, which is location data of the determined center point, and
set the center line by regression analysis using the first location data and the second location data.

3. The device for modeling blades of claim 2, wherein the processor is further configured to:
when setting a virtual straight line for a second measurement surface different from the first measurement surface included in the reference blade,
measure location data on the second measurement surface using the photographing data, and
set a virtual straight line for the second measurement surface based on the measured location data on the second measurement surface and a plurality of virtual straight lines for the first measurement surface including the center line.

4. The device for modeling blades of claim 3, wherein the plurality of virtual straight lines for the first measurement surface including the center line comprises the center line, a left line that is a virtual straight line based on a left edge of the blade box, and a right line that is a virtual straight line based on a right edge of the blade box.

5. The device for modeling blades of claim 4, wherein the processor is further configured to:
derive a plurality of preliminary virtual straight lines for the second measurement surface based on the measured location data on the second measurement surface, and
correct the plurality of preliminary virtual straight lines for the second measurement surface by using at least one of a parallel translation technique and an orthogonal projection technique based on the plurality of virtual straight lines for the first measurement surface, and
wherein the reference blade model generation unit corrects the plurality of preliminary virtual straight lines by orthogonally projecting the plurality of preliminary virtual straight lines onto a surface that includes the left line or the right line for the first measurement surface and is perpendicular to the first measurement surface when correcting the plurality of preliminary virtual straight lines using the orthogonal projection technique.

6. The device for modeling blades of claim 1, wherein the processor is further configured to: p1 set the virtual coordinate system for each of the plurality of surfaces included in the reference blade, with a point where a nose of the wind turbine and the center line intersect as an origin and the center line as one axis, and predict a preliminary other blade model by rotating the virtual coordinate system for each of the plurality of surfaces by a predetermined angle.

7. The device for modeling blades of claim 6, wherein the processor is further configured to:

receive sensing data of the drone for the other blades, and correct the predicted preliminary other blade model using the sensing data of the drone for the other blades and generate the other blade model.

8. The device for modeling blades of claim 7, wherein the processor corrects the preliminary other blade model using a recursive least squares method.

9. A method of modeling a blade of a wind turbine, comprising:

obtaining photographing data on a first surface of the blade at a plurality of time points;

modeling the first surface as a virtual straight line for the first surface; and modeling a second surface using at least one of a parallel translation technique and an orthogonal projection technique based on a virtual straight line for the first surface, wherein the virtual straight line for the first surface comprises at least one of a left line, a center line, and a right line for the first surface, and wherein the modeling the second surface models the second surface by correcting a position of a preliminary virtual straight line for the second surface generated based on location data on the second surface so as to be parallel to any one of the left line, the center line, and the right line for the first surface or by orthogonally projecting the preliminary virtual straight line for the second surface generated based on the location data on the second surface onto a surface that includes the left line or the right line for the first surface and is perpendicular to the first surface.

10. The method of claim 9, wherein the virtual straight line is represented by a reference point and a vector, and wherein the modeling the first surface:

generates a plurality of location data from the photographing data on the first surface, calculates the reference point as an average of the plurality of location data, and calculates the vector using a difference between the location data and the average.

11. The method of claim 9, wherein the modeling the first surface models the first surface as the left line, the center line, and the right line, and wherein the modeling the second surface:

models the second surface by orthogonally projecting the preliminary virtual straight line for the second surface onto a surface that includes the left line for the first surface and is perpendicular to the first surface if the second surface is a left surface of the first surface, and models the second surface by orthogonally projecting the preliminary virtual straight line for the second surface onto a surface that includes the right line for the first surface and is perpendicular to the first surface if the second surface is a right surface of the first surface.

12. The method of claim 9, wherein the modeling the first surface models the first surface as the left line, the center line, and the right line, and wherein the modeling the second surface models the second surface so that center lines, right lines, and left lines of the first surface and the second surface are parallel if the second surface is a rear surface of the first surface.

* * * * *